United States Patent [19]
Oshima et al.

[11] Patent Number: 5,883,736
[45] Date of Patent: Mar. 16, 1999

[54] ER-DOPED OPTICAL FIBER AMPLIFIER

[75] Inventors: Isamu Oshima; Akira Fujisaki; Haruki Ogoshi, all of Tokyo, Japan

[73] Assignee: The Furukawa Electric Co., Ltd., Tokyo, Japan

[21] Appl. No.: 803,678

[22] Filed: Feb. 21, 1997

[30]     Foreign Application Priority Data

Feb. 23, 1996  [JP]  Japan .................................. 8-036406

[51] Int. Cl.⁶ ..................................................... H01S 03/00
[52] U.S. Cl. ........................................... 359/341; 359/334
[58] Field of Search ................... 359/334, 341; 372/6, 70

[56]             References Cited

U.S. PATENT DOCUMENTS 5,323,404   6/1994   Grubb ........................................ 372/6

*Primary Examiner*—Mark Hellner
*Attorney, Agent, or Firm*—Jacobson, Price, Holman & Stern, PLLC

[57]              ABSTRACT

An Er-doped optical fiber amplifier is adapted to increase the length of transmission path by raising the intensity of pumped light. In an Er-doped optical fiber amplifier 1 for amplifying signal light by means of an Er-doped optical fiber 7, using a 1,530 nm band pumping source 8, 1,530 nm band pumped light is Raman-amplified by a 1,430 nm–1,450 nm band light source 9 on the transmission path of an optical fiber 5.

4 Claims, 6 Drawing Sheets

(A) BEFORE PASSING THROUGH DSF (B) AFTER PASSING THROUGH DSF
WITHOUT RAMAN-AMPLIFICATION (C) AFTER PASSING THROUGH DSF
WITH RAMAN-AMPLIFICATION

ER-DOPED OPTICAL FIBER AMPLIFIER

BACKGROUND OF THE INVENTION

1. Field of the Invention

This invention relates to an optical amplifier to be used for an optical transmission system and, more particularly, it relates to a remotely pumped Er-doped optical fiber amplifier.

2. Prior Art

Remotely pumped optical amplifiers have been proposed for optical amplifiers to be used in submarine optical transmission systems because the pumping source to be used for the system does not have to be laid on the seabed.

While 980 nm and 1,480 nm bands are widely used for pumping light for Er-doped optical fiber amplifiers, a pumping source with the latter band, or the 1,480 nm band, is typically used for a remotely pumped amplifier system because of its low loss rate in the optical transmission path.

A remotely pumped optical amplifier has an advantage that the pumping source does not have to be laid on the seabed and a disadvantage that the intensity of pumping light is reduced before it gets to the Er-doped optical fiber due to the loss of the pumping light as it passes through the optical transmission path.

Thus, the distance between the Er-doped optical fiber and the pumping source has to be made as short as possible in order to ensure an intensity of the pumping light getting to the Er-doped optical fiber. In other words, the transmission path is subjected to a relatively short limit length.

This disadvantage on the part of the remotely pumped amplifier system can be partly overcome by increasing intensity of pumping light by use of polarization combiner and wavelength division multiplexer/demultiplexer and thereby increasing the limit distance between the pumping source and the Er-doped optical fiber.

Currently, however, only up to four semiconductor lasers can be polarization- and wavelength-multiplexed and hence there is a strong demand for means that can secure an enhanced intensity of pumping light.

In view of the above circumstances, it is therefore the object of the present invention to provide an Er-doped optical fiber amplifier adapted to increase the length of transmission path by raising the intensity of pumped light.

SUMMARY OF THE INVENTION

According to the invention, the above object is achieved by providing an Er-doped optical amplifier for amplifying signal light, using a 1,530 nm band pumping source, characterized in that 1,530 nm band light pumped from the pumping source is Raman-amplified by a 1,430 nm–1,450 nm band light source on the transmission path of optical fiber.

In au optical amplifier according to the invention, preferably, 1,530 nm band pumped light is Raman-amplified by the 1,430 nm–1,450 nm band light source on the transmission path of dispersion shifted optical fiber.

In an optical amplifier according to the invention, preferably, signal light has a wavelength of a 1,550 nm–1,570 nm band.

In an optical amplifier according to the invention, preferably, signal light is Raman-amplified by a 1,460 nm–1,480 nm band light source on the transmission path of dispersion shifted optical fiber.

According to the invention, the traveling distance of pumping light to get to the Er-doped optical fiber can be increased since a 1,530 nm band light source having a relatively small transmission loss compared to a 1,480 nm band light source is used as pumping source and the decrease in the intensity of pumping light that occurs on the transmission path of optical fiber is compensated as 1,530 nm band pumped light is Raman-amplified by a 1,430 nm–1,450 nm band light source so that the traveling distance of pumping light to get to the Er-doped optical fiber can be further increased.

The Raman-amplification effect of an optical amplifier according to the invention can be improved to further increase the traveling distance of pumping light to get to the Er-doped optical fiber if dispersion shifted optical fiber that is suited for Raman-amplification is used for the optical fiber for Raman-amplifying 1,530 nm band pumped light.

Besides the 980 nm and 1,480 nm bands, the 1,530 nm band is known as absorption wavelength band of Er-doped optical fiber.

FIG. 5 of the accompanying drawings illustrates the gain-signal wavelength relationship for Er-doped optical fiber when a 1,530 nm band pumping source is used and the intensity of incident signal light and that of pumped light are respectively minus 35 dBm and 40 mW.

The present invention utilizes light with a wavelength close to the 1,530 mn band that can offer minimum transmission loss between pumping source and Er-doped optical fiber among the light of wavelength band which can excite Er-doped optical fiber.

Pumped light having a wavelength close to the 1,530 nm band is then Raman-amplified by means of a 1,430 nm–1,450 nm band light source to compensate the transmission loss of the 1,530 nm band pumped light between pumping source and Er-doped optical fiber.

The gain-related performance of an optical amplifier according to the invention can be further improved if signal light has a wavelength of a 1,550 nm–1,570 mn band because signal light with a wavelength of a 1,550 nm–1,570 nm is Raman-amplified by 1,450 nm wavelength light in addition to that pumped light with a wavelength close to 1,530 nm band is Raman-amplified by means of a 1,430 nm–1,450 nm light source.

The gain-related performance of an optical amplifier according to the invention can also be improved if signal light is Raman-amplified by 1,460–1,480 nm band light source for Raman-amplification on the transmission path.

DETAILED DESCRIPTION OF THE PREFERRED EMBODIMENT

Now, the present invention will be described in greater detail by referring to the accompanying drawings that illustrate a preferred embodiment of the invention.

Figure 1:
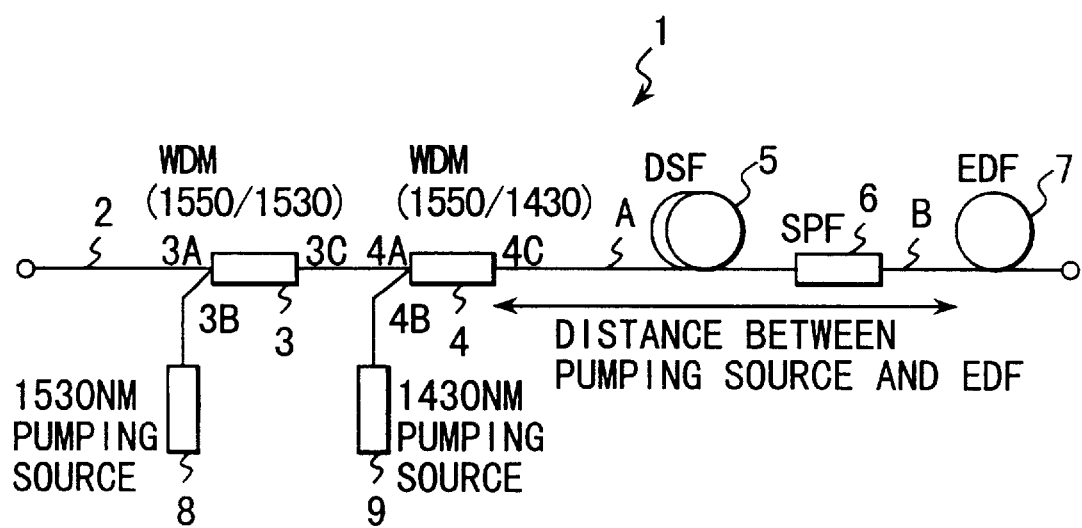
FIG. 1 is a schematic illustration of the configuration of an embodiment of optical amplifier according to the invention.

FIG. 1 is a schematic illustration of the basic configuration of an embodiment of optical amplifier according to the invention.

Referring to FIG. 1, the embodiment of optical amplifier 1 comprises a signal light input optical fiber 2, a wavelength division multiplexer/demultiplexer 3, another wavelength division multiplexer/demultiplexer 4, a dispersion shifted optical fiber 5, a band-pass filter 6 and an Er-doped optical fiber 7 arranged and connected in the above mentioned order.

The wavelength division multiplexer/demultiplexer 3 has an input port 3b connected to a pumping source 8 whereas the wavelength division multiplexer/demultiplexer 4 has an input port 4b connected to a light source 9 for Raman amplification.

The wavelength division multiplexer/demultiplexer 3 has an input port 3a that allows light with a wavelength close to 1,550 nm to pass therethrough, another input port 3b that allows light with a wavelength close to 1,530 nm to pass therethrough and an out-put port 3c that allows both light with a wavelength close to 1,550 nm and light with a wavelength close to 1,530 nm.

On the other hand, the wavelength division multiplexer/demultiplexer 4 has an input port 4a that allows light with a wavelength close to 1,550 nm to pass therethrough, another input port 4b that allows light with a wavelength close to 1,430 nm to pass therethrough and an output port 4c that allows both light with a wavelength close to 1,550 nm and light with a wavelength close to 1,430 nm.

The light with wavelength of 1,530 nm has a role of exciting the Er-doped optical fiber and the light wavelength of 1,430 nm has a role of increasing the the light with wavelength of 1,530 nm by Raman amplification.

The dispersion shifted optical fiber 5 connecting the wavelength division multiplexer/demultiplexer 4 and the Er-doped optical fiber 7 has a core diameter smaller than that of a standard single-mode optical fiber so that it is more subject to Raman-amplification.

Figure 2A:
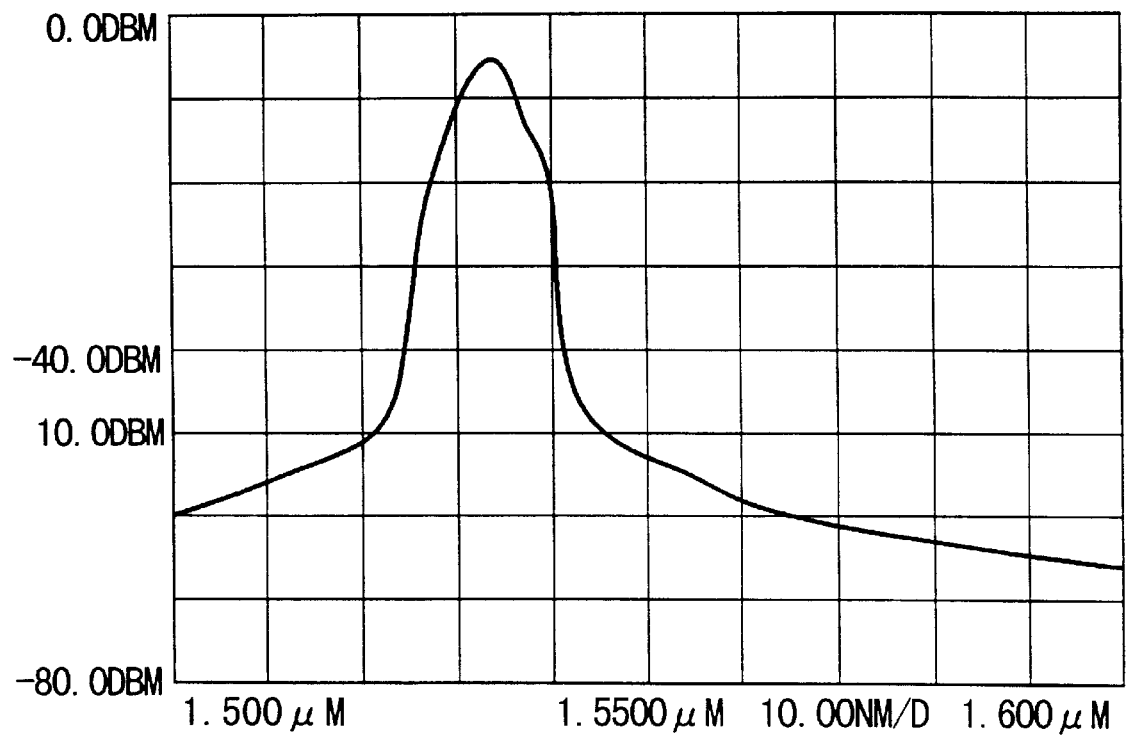
FIG. 2 shows graphs of the spectral wave forms of pumping light of the embodiment of FIG. 1, illustrating the effect of Raman-amplification.
Figure 2B:
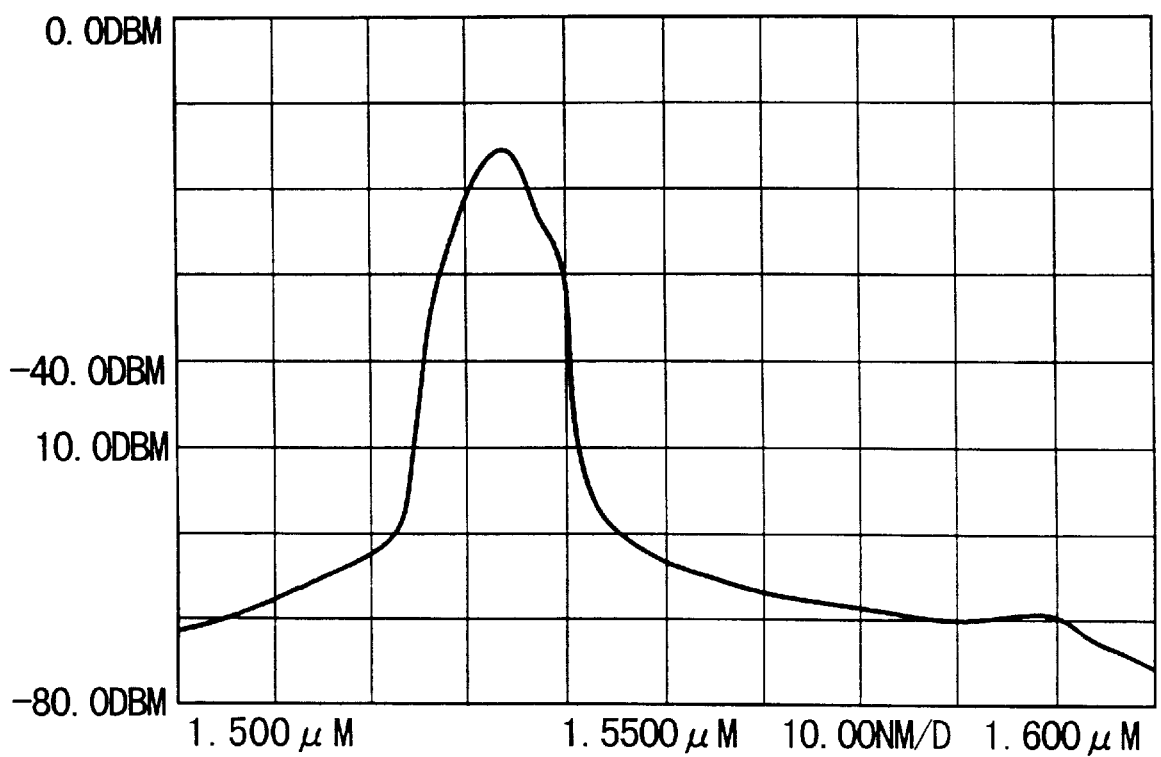
Figure 2C:
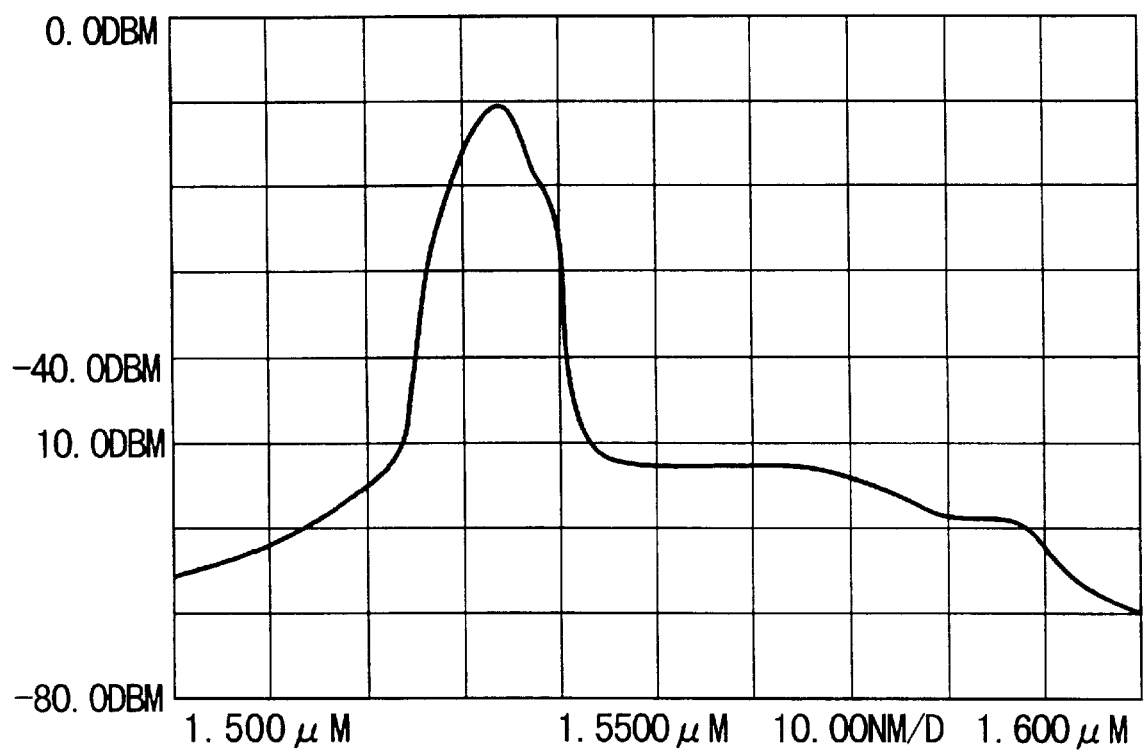

FIG. 2 shows graphs of the spectral wave forms of pumped light of the embodiment of FIG. 1, representing a state where light from the pumping source 8 with a wavelength close to 1,530 nm is Raman-amplified by light with a wavelength of 1,430 nm from the light source 9 and a state where light from the pumping source 8 with a wavelength close to 1,530 nm is not Raman-amplified.

More specifically, graph (a) in FIG. 2 shows the spectral wave form of light with a wavelength close to 1,530 nm before passing through point A of FIG. 1 or the dispersion shifted optical fiber 5.

On the other hand, graph (b) in FIG. 2 shows the spectral wave form of light with a wavelength close to 1,530 nm after passing through point B of FIG. 1 or the dispersion shifted optical fiber 5 when the pumping light with a wavelength of 1,430 nm is not given.

Finally, graph (c) in FIG. 2 shows the spectral wave form of light with a wavelength close to 1,530 nm after passing through point B of FIG. 1 simultaneously with pumping light with a wavelength of 1,430 nm. it will be seen from FIG. 2 that, when pumped light with a wavelength of 1,530 nm is made to pass through the dispersion shifted optical fiber 5 simultaneously with pumping light with a wavelength of 1,430 nm, the intensity of light with a wavelength of 1,530 nm is increased by Raman-amplification.

Referring to FIG. 2, in an experiment where the intensity of pumping light with a wavelength of 1,430 nm was 230 mW and the length of the dispersion shifted optical fiber 5 was 40 km, the intensity of light with a wavelength close to 1,530 nm was boosted by about 5.5 dB by Raman-amplification. In other words, the Raman-amplification provided a gain of about 5.5 dB.

Additionally, a gain of about 10.4 dB was obtained for signal light (with a wavelength of 1,554 nm) by Raman-amplification due to pumping light with a wavelength of 1,430 nm.

After passing through the dispersion shifted optical fiber 5, the light is made to pas through the band-pass filter that removes any wavelengths not greater than 1,500 nm, so the light with wavelength of 1,430 nm is removed. The light having wavelengths longer than 1,530 nm that is the wavelength of Raman-amplified pumping light is made to enter the Er-doped optical fiber 7, then the light with a wavelength of 1,530 nm excites Er-doped optical fiber and the signal light with a wavelength of 1,554 nm is amplified.

Thus, since the output of the pumping source with a wavelength of 1,530 nm is Raman-amplified in a manner as described above, it gets to the Er-doped optical fiber 7 with an intensity sufficient for the Er-doped optical fiber 7 to operate as an optical amplifier if the Er-doped optical fiber 7 and the pumping source 8 are separated by a large distance so that consequently, both pumping light and signal light can be transmitted over a large distance.

Figure 3:
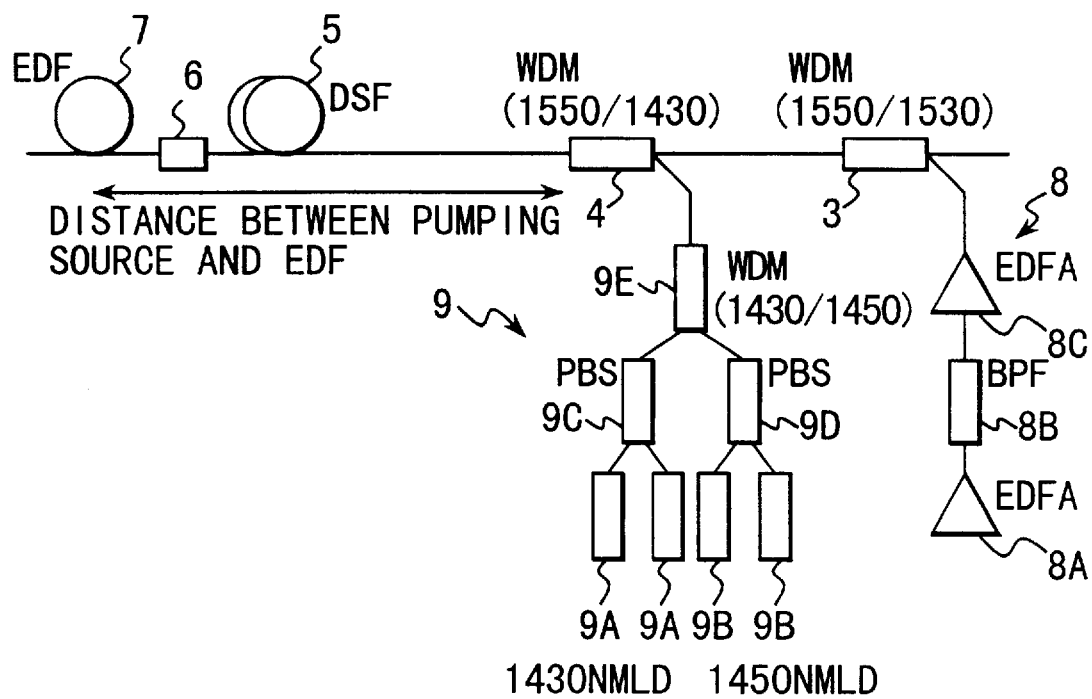
FIG. 3 is a schematic illustration of the configuration of combination of a pumping source and a light source for Raman amplification that can be used for the embodiment of FIG. 1.

FIG. 3 is a schematic illustration of the configuration including a combination of a remote pumping source arid a light source for Raman amplification that can be used for the above embodiment, where amplified spontaneous emission from another Er-doped optical fiber amplifier is used for pumping light with a 1,530 nm band.

A pumping source 8 with a 1,531 nm band so operates that amplified spontaneous emission from an Er-doped optical fiber amplifier 8a is made to pass through a band-pass filter 8b that removes any wavelengths other than the one close to 1,530 nm and thereafter amplified by the Er-doped optical fiber 8c before it is entered into a wavelength division multiplexer/demultiplexer 3 and added to signal light for multiplexing.

Additionally, in this modified embodiment a pair of light sources 9a with an optical wavelength of 1,435 nm and a pair of light sources 9b with an optical wavelength of 1,450 nm are used and rays of light coming from these paired light sources are multiplexed by respective polarization combiners 9c and 9d.

The rays of light multiplexed by the polarization combiners 9c and 9d and having wavelengths of 1,430 nm and 1,450 nm are further multiplexed by a wavelength division multiplexer/demultiplexer 9e and entered into another wavelength division multiplexer/demultiplexer 4 before sent to a dispersion shifted optical fiber 5.

Since the optical amplifier of FIG. 3 operates in a manner similar to that of the optical amplifier of FIG. 1, its operation will not be described here any further.

Figure 4:
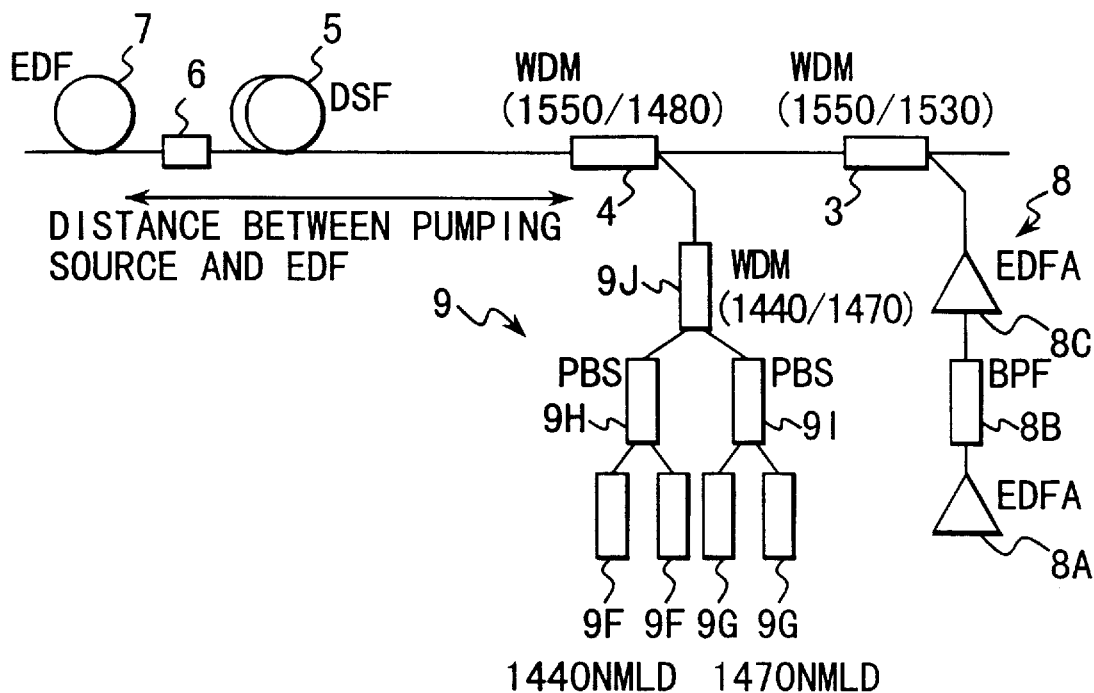
FIG. 4 is a schematic illustration of the configuration of another combination of a pumping source and a light source for Raman-amplification that can be used for the embodiment of FIG. 1.
Figure 5:
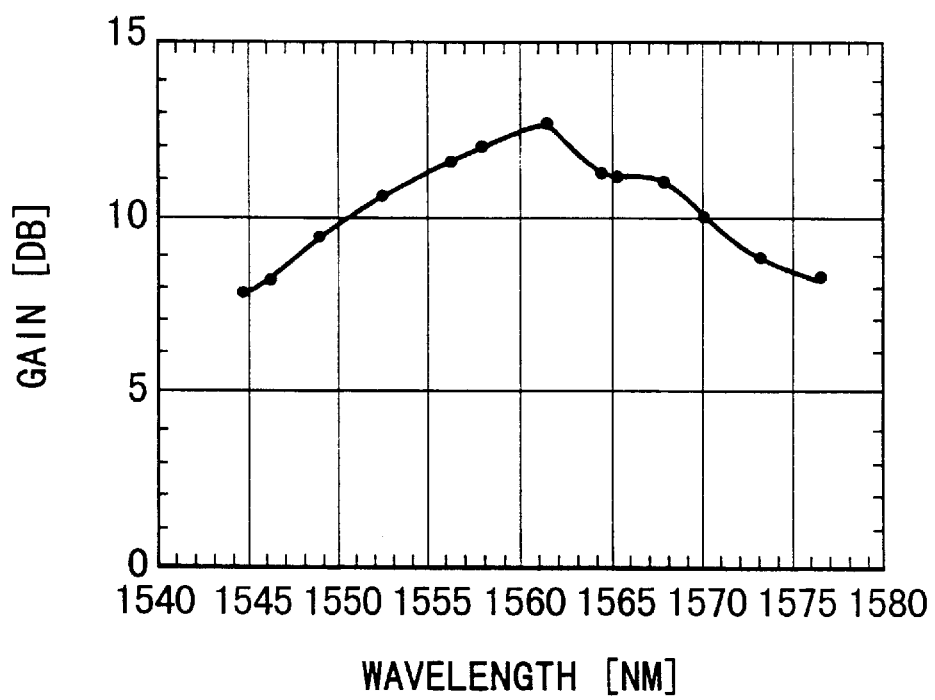
FIG. 5 is a graph showing the relationship between the gain and the signal wavelength of Er-doped optical fiber when pumping light having a wavelength of 1,530 nm band is used.

FIG. 4 is a schematic illustration of the configuration including another combination of a remote pumping source and a light source for Raman amplification that can be used for the above embodiment, where amplified spontaneous emission from an Er-doped optical fiber amplifier is used for pumped light with a 1,530 nm band.

A pumping source 8 with a 1,530 nm band so operates that amplified spontaneous emission from an Er-doped optical fiber 8a is made to pass through a band pass filter 8b that removes any wavelengths other than the one close to 1,530 nm and thereafter amplified by the Er-doped optical fiber amplifier 8c before it is entered into a wavelength division multiplexer/demultiplexer 3 and added to signal light for multiplexing.

Additionally, in this modified embodiment, a pair of light sources 9f with an optical wavelength of 1,440 nm and a pair of light sources 9g with an optical wavelength of 1,470 nm are used and rays of light coming from these paired light sources are multiplexed by respective polarization combiners 9h and 9i.

The rays of light multiplexed by the polarization combiners 9h and 9i and having wavelengths of 1,440 nm and 1,470 nm are further multiplexed by a wavelength division multiplexer/demultiplexer 9j and entered into another wavelength division multiplexer/demultiplexer 4 before sent to a dispersion shifted optical fiber 5.

The rays of light having a wavelength of 1,440 nm and entered into the wavelength division multiplexer/demultiplexer 4 are used for Raman-amplification of the pumping source 8 to compensate the loss of pumped light with a 1,530 nm band on the transmission path.

On the other hand, the rays of light having a wavelength of 1,470 nm and entered into the wavelength division multiplexer/demultiplexer 4 are used for Raman-amplification of signal light to compensate the loss of signal light with a 1,550 nm band on the transmission path.

In other words, signal light is Raman-amplified by means of a pumping source 9g for Raman-amplifying signal light and pumped light with a wavelength close to 1,530 nm is Raman-amplified by means of another pumping source 9f for Raman-amplifying pumping light with wavelengths of 1,430 nm–1,450 nm to obtain a high-intensity level for both pumped light with a wavelength close to 1,530 nm and signal light with a wavelength close to 1,550 nm to be able to get to the Er-doped optical fiber 7.

Consequently, the gain-related performance of the optical amplifier is greatly improved to make both pumped light and signal light to be able to travel over a very long distance.

As described above, with an optical amplifier according to the invention, the traveling distance of pumping light to get to the Er-doped optical fiber can be increased since a 1,530 nm band light source having a relatively small transmission loss compared to 1,480 nm band and 980 nm band is used as pumping source and the decrease in the intensity of pumped light that occurs on the transmission path of optical fiber is compensated as 1,530 nm band pumped light is Raman-amplified by a 1,430 nm–1,450 nm band light source so that the traveling distance of pumping light to get-to the Er-doped optical fiber can be further increased.

The Raman-amplification effect of an optical amplifier according to the invention can be improved to farther increase the traveling distance of pumping light to get to the Er-doped optical fiber if dispersion shifted optical fiber that is suited for Raman-amplification is used for the optical fiber for Raman-amplifying 1,530 nm band pumped light.

What is claimed is:

1. An Er-doped optical fiber amplifier for amplifying signal light by means of an Er-doped optical fiber, using a 1,530 nm band pumping source, characterized in that 1,530 nm band light pumped from the pumping source is Raman-amplified by a 1,430–1,450 nm band light source on the transmission path of optical fiber.

2. An optical amplifier according to claim 1, characterized in that 1,530 nm band light is Raman-amplified, by the 1,430 nm–1,450 nm band light source on the transmission path of dispersion shifted optical fiber.

3. An optical amplifier according to claim 1, characterized in that signal light has a wavelength of a 1,550 nm–1,570 nm band.

4. An optical amplifier according to claim 1, characterized in that signal light is Raman-amplified by a 1,460 nm–1,480 nm band light source on the transmission path of dispersion shifted optical fiber.

* * * * *